United States Patent
Choi et al.

(10) Patent No.: US 8,415,055 B2
(45) Date of Patent: Apr. 9, 2013

(54) ELECTROLYTE COMPOSITION AND CATALYST INK AND SOLID ELECTROLYTE MEMBRANE FORMED BY USING THE SAME

(75) Inventors: Jae-man Choi, Hwaseong-si (KR); Young-gyoon Ryu, Suwon-si (KR); Han-su Kim, Seoul (KR); Dong-Joon Lee, Seoul (KR); Moon-seok Kwon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 625 days.

(21) Appl. No.: 12/608,064

(22) Filed: Oct. 29, 2009

(65) Prior Publication Data

US 2010/0104947 A1   Apr. 29, 2010

(30) Foreign Application Priority Data

Oct. 29, 2008 (KR) .................. 10-2008-0106576
Aug. 25, 2009 (KR) .................. 10-2009-0078835

(51) Int. Cl.
*H01M 6/18* (2006.01)
*H01M 10/0565* (2010.01)

(52) U.S. Cl. .................. 429/304; 429/188; 429/309

(58) Field of Classification Search .................. None
See application file for complete search history.

(56) References Cited

U.S. PATENT DOCUMENTS

| | | | |
|---|---|---|---|
| 5,650,245 A | 7/1997 | Zhong et al. | |
| 6,296,783 B1 | 10/2001 | Shindo et al. | |
| 6,716,553 B1 | 4/2004 | Fujita et al. | |
| 6,746,803 B1 | 6/2004 | Bauer et al. | |
| 7,063,918 B2 | 6/2006 | Kofinas et al. | |
| 2003/0129500 A1 | 7/2003 | Gan et al. | |
| 2004/0062988 A1 | 4/2004 | Kofinas et al. | |
| 2004/0126655 A1 | 7/2004 | Hisamitsu et al. | |
| 2005/0053843 A1 | 3/2005 | Takahashi | |
| 2005/0132562 A1 | 6/2005 | Saito et al. | |
| 2005/0233210 A1 | 10/2005 | Horie et al. | |
| 2005/0234177 A1 | 10/2005 | Zaghib et al. | |
| 2006/0257736 A1 | 11/2006 | Watanabe et al. | |
| 2007/0195125 A1 | 8/2007 | Saito et al. | |
| 2008/0014496 A1* | 1/2008 | Watanabe et al. ............. 429/129 |
| 2008/0220330 A1 | 9/2008 | Hosaka et al. | |
| 2008/0248335 A1 | 10/2008 | Kinoshita et al. | |
| 2009/0191464 A1 | 7/2009 | Ryu et al. | |

FOREIGN PATENT DOCUMENTS

| | | |
|---|---|---|
| EP | 1 376 620 | 1/2004 |
| JP | 2001-43835 | 2/2001 |
| JP | 2005-50707 | 2/2005 |
| JP | 2005-174617 | 6/2005 |

(Continued)

OTHER PUBLICATIONS

Suga et al. "Photocrosslinked nitroxide polymer cathode-active materials for application in an organic-based paper battery" Chem. Commun., 2007, 1730-1732.

(Continued)

*Primary Examiner* — Krishnan S Menon
(74) *Attorney, Agent, or Firm* — Stein IP, LLC

(57) ABSTRACT

An electrolyte composition and catalyst ink, a solid electrolyte membrane formed by printing the electrolyte composition and catalyst ink, and a secondary battery including the solid electrolyte membrane. An electrolyte composition includes a solvent; a lithium salt dissolved in the solvent; and a cycloolefin-based monomer dissolved or dispersed in the solvent and a catalyst ink includes a catalyst that promotes the ring-opening and polymerization reactions of the cycloolefin monomers of the electrolyte composition.

3 Claims, 6 Drawing Sheets

FOREIGN PATENT DOCUMENTS

| | | |
|---|---|---|
| KR | 10-2006-0109620 | 10/2006 |
| WO | WO 2005/013400 | 2/2005 |
| WO | WO 2007/043624 | 4/2007 |

OTHER PUBLICATIONS

Katsumata et al. "*Polyacetylene and Polynorbomene Derivatives Carrying TEMPO. Synthesis and Properties as Organic Radical Battery Materials*" Macromol, Rapid Commun., 2006, 27, 1206-1211.

European Search Report dated Jan. 26, 2010, issued in corresponding European Patent Application No. 09174395.5.

European Communication dated Jun. 14, 2011, issued in corresponding European Patent Application No. 09174395.5.

Takega Suga, et al., *Photocrosslinked nitroxide polymer cathode-active materials for application in an organic-based paper battery*, Feb. 12, 2007, pp. 1730-1732.

* cited by examiner

ELECTROLYTE COMPOSITION AND CATALYST INK AND SOLID ELECTROLYTE MEMBRANE FORMED BY USING THE SAME

CROSS-REFERENCE TO RELATED APPLICATIONS

This application claims the benefit of Korean Patent Application No. 10-2008-0106576, filed on Oct. 29, 2008 and Korean Patent Application No. 10-2009-0078835, filed on Aug. 25, 2009, in the Korean Intellectual Property Office, the disclosures of which are incorporated herein in their entirety by reference.

BACKGROUND

1. Field

One or more embodiments relate to an electrolyte composition and a catalyst ink, a solid electrolyte membrane formed by using the electrolyte composition and the catalyst ink, and a secondary battery including the solid electrolyte membrane. More particularly, one or more embodiments relate to an electrolyte ink and a catalyst ink which are used to form a solid electrolyte membrane, a solid electrolyte membrane formed by ink-jet printing the electrolyte ink and the catalyst ink, and a secondary battery including the solid electrolyte membrane.

2. Description of the Related Art

Secondary batteries are becoming increasingly used as a power source for portable devices, such as mobile phones, personal digital assistants (PDAs), or portable multimedia players (PMPs); a power source for driving motors of high power hybrid mobile vehicles or electric vehicles; or a power source for flexible displays such as electronic ink (e-ink), electronic paper (e-paper), flexible liquid crystal display devices (LCDs), or flexible organic light emitting diodes (OLEDs). In the future, secondary batteries are expected to be used as a power source for integrated circuit devices on printed circuit boards.

Secondary batteries typically use a solid electrolyte. Examples of the solid electrolyte include all-solid electrolytes formed by using a lithium salt and an ion-conductive polymer such as PEO or PPO; gel polymer electrolytes formed by using a non-ionic conductive polymer such as PVC, PAN, PMMA, or PVdF; and LiPON for deposition thin film batteries. To manufacture all-solid electrolytes, conventionally, ink that includes a lithium salt, an ion-conductive polymer, and a solvent is coated or printed in an ink phase and then the solvent is dried. To manufacture gel polymer electrolytes, conventionally, ink that includes a lithium salt, a non-ionic conductive host polymer, a solvent, and a polymerization initiator is hardened by heat or irradiation of ultraviolet rays so that the non-ionic conductive host polymer is cross-linked. To manufacture LiPON for deposition thin film batteries, sputtering is performed using $Li_3PO_4$ as a target.

SUMMARY

One or more embodiments include an electrolyte composition and a catalyst ink that are used to form a solid electrolyte membrane.

One or more embodiments include a method of manufacturing a solid electrolyte membrane by printing the electrolyte composition and catalyst ink.

One or more embodiments include a solid electrolyte membrane manufactured using the method and a secondary battery using the electrolyte membrane.

Additional aspects will be set forth in part in the description which follows and, in part, will be apparent from the description, or may be learned by practice of the invention.

To achieve the above and/or other aspects, one or more embodiments may include an electrolyte composition including: a solvent; a lithium salt dissolved in the solvent, and a cycloolefin-based monomer dissolved or dispersed in the solvent.

The cycloolefin-based monomer may be selected from a norbornene-based monomer and a dicyclopentadiene-based monomer.

To achieve the above and/or other aspects, one or more embodiments may include a catalyst ink including an organic solvent and a catalyst which is dissolved or dispersed in the organic solvent and promotes the ring-opening and polymerization reactions.

As a non-limiting example, the catalyst may be a Grubbs catalyst.

To achieve the above and/or other aspects, one or more embodiments may include a method of manufacturing a solid electrolyte membrane, the method including: printing the catalyst ink described above on an electrode; drying the printed catalyst ink; applying the electrolyte composition described above onto an area of the electrode on which the catalyst ink was printed; and forming a ring-opened polymer of the cycloolefin monomer in the electrolyte composition.

As a non-limiting example, the catalyst ink may be directly printed on an electrode on which an active material is coated.

To achieve the above and/or other aspects, one or more embodiments may include a method of manufacturing a solid electrolyte membrane, the method including: applying the electrolyte composition described above on an electrode; printing the catalyst ink described above on a portion of the electrode on which the electrolyte composition was applied; and forming a ring-opened polymer of the cycloolefin monomer in the electrolyte composition.

To achieve the above and/or other aspects, one or more embodiments may include a solid electrolyte membrane manufactured using the method described above.

To achieve the above and/or other aspects, one or more embodiments may include a solid electrolyte membrane including: a lithium salt, a solvent, and a ring-opened polymer of a cycloolefin monomer.

As a non-limiting example, the ring-opened polymer of a cycloolefin monomer may be a ring-opened polymer of a norbornene-based monomer or a ring-opened polymer of a dicyclopentadiene-based monomer.

Additional aspects and/or advantages will be set forth in part in the description which follows and, in part, will be apparent from the description, or may be learned by practice of the invention.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
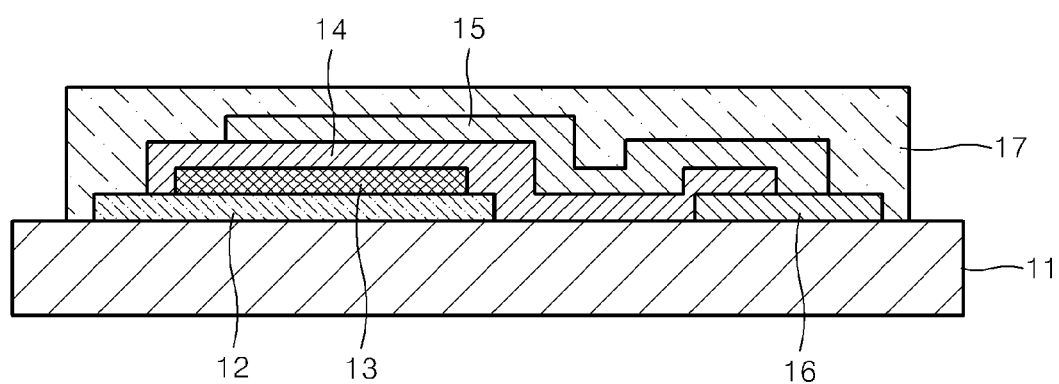
FIG. 1 is a schematic sectional view of a secondary battery according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Hereinafter, an electrolyte composition and a catalyst ink which are used to form a solid electrolyte membrane will be described in detail.

An electrolyte composition according to an embodiment includes a solvent, a lithium salt dissolved in the solvent and a cycloolefin-based monomer dissolved or dispersed in the solvent.

The electrolyte composition may be an electrolyte ink that is inkjet-printable. In this regard, the viscosity of the electrolyte ink may be about 100 mPa·sec or lower at a temperature of 25° C. and at a shear rate of 1000 sec$^{-1}$. For example, the viscosity of the electrolyte ink may be in the range of about 2 to about 6 mPa·sec at a temperature of 25° C. and at a shear rate of 1000 sec$^{-1}$.

The solvent included in the electrolyte composition may be a solvent having a high ionic conductivity, a high dielectric constant, and a low viscosity, such as a mixed solvent that includes a solvent having a high dielectric constant and a solvent having a low boiling point. The solvent having a high dielectric constant may be any such solvent that is used in the art. Examples of the solvent having a high dielectric constant include cyclic carbonates, such as ethylene carbonate, propylene carbonate, or butylene carbonate, and gamma-butyrolactone. However, the solvent having a high dielectric constant is not limited to these materials. Also, the solvent having a low boiling point may be any such solvent that is used in the art. Examples of the solvent having a low boiling point include chain carbonates, such as dimethyl carbonate, ethylmethyl carbonate, diethyl carbonate, or dipropyl carbonate; dimethoxyethane; diethoxyethane; and fatty acid ester derivatives. However, the solvent having a low boiling point is not limited to these materials. The mixture volume ratio of the solvent having a high dielectric constant to the solvent having a low boiling point may be in a range of about 1:1 to about 1:9 in consideration of a discharge capacity and a charge/discharge lifetime.

The lithium salt is dissolved in the mixed solvent and may be any material that is conventionally used in lithium batteries. The lithium salt may include at least one compound selected from the group consisting of LiClO$_4$, LiCF$_3$SO$_3$, LiPF$_6$, LiN(CF$_3$SO$_2$)$_2$, LiBF$_4$, LiC(CF$_3$SO$_2$)$_3$, and LiN(C$_2$F$_5$SO$_2$)$_2$. The concentration of the lithium salt in the mixed solvent may be in a range of about 0.5 to about 2M so that the solid electrolyte membrane retains a high ionic conductivity and so that a decrease in ion mobility due to viscosity of the electrolyte composition is prevented.

The electrolyte composition according to an embodiment is prepared by adding the cycloolefin-based monomer to the solvent in which the lithium salt is dissolved. Due to a catalyst contained in a catalyst ink which will be described later, a double bond in the ring of the cycloolefin-based monomer is decomposed, that is, a ring-opening reaction occurs. Then, the ring-opened cycloolefin-based monomer is polymerized with other ring-opened cycloolefin-based monomers to produce a polymer. When the polymer is formed, the electrolyte composition may be solidified. Therefore, a hardening process, which is typically used to manufacture a gel electrolyte, is not required. In addition, the electrolyte composition including the cycloolefin-based monomer may be in ink form and have lower viscosity than a conventional electrolyte ink including a polymer so that the electrolyte ink including the cycloolefin-based monomer may be easily manipulated when the solid electrolyte membrane is manufactured.

The amount of the cycloolefin-based monomer may be in a range of about 0.5 to about 10 wt % based on the weight of the electrolyte composition. (Herein, "wt %" refers to percent by weight.) If the amount of the cycloolefin-based monomer is 0.5 wt % or more based on the weight of the electrolyte composition, the solid electrolyte membrane has high strength, and if the amount of the cycloolefin-based monomer is 10 wt % or lower based on the weight of the electrolyte composition, appropriate solubility with respect to the solvent and good electrolytic characteristics may be obtained.

Examples of the cycloolefin-based monomer that facilitates ring-opening and polymerization reactions include a norbornene-based monomer and a dicyclopentadiene-based monomer.

The norbornene-based monomer used in an embodiment may be a compound represented by Formula 1:

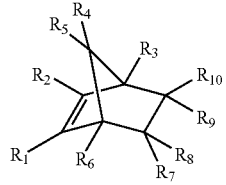

[Formula 1]

wherein $R_1$ through $R_{10}$ are each independently, hydrogen, halogen, a hydroxyl group, a carboxyl group, an amino group, a cyano group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C30 aryl group, a substituted or unsubstituted C7-C30 arylalkyl group, a substituted or unsubstituted C7-C30 alkylaryl group, a substituted or unsubstituted C1-C20 heteroalkyl group, a substituted or unsubstituted C4-C30 heteroaryl group, a C7-C30 arylcarbonyl group, a C2-C20 alkyloxycarbonyl group, a C2-C20 alkylcarbonyl group, or a C2-C20 alkylcarbonyloxy group;

$R_4$ and $R_5$ together may form =O;

$R_7$ and $R_9$ may be linked to each other to form a 5-membered or 6-membered ring or heteroring structure; and $R_8$ and $R_{10}$ together may represent an additional bond between the carbon atoms to which $R_7$ and $R_9$ are attached. In other words, in place of $R_8$ and $R_{10}$, a double bond may exist between the carbon atoms to which $R_7$ and $R_9$ are attached.

A compound that is formed by bonding $R_7$ and $R_9$ in Formula 1 to form a ring structure may be a compound represented by Formula 2, that is, a dicyclopentadiene-based monomer:

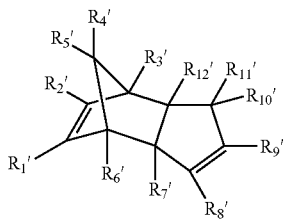

[Formula 2]

wherein $R_1'$ through $R_{12}'$ are each independently, hydrogen, halogen, hydroxy, a carboxyl group, an amino group, a cyano group, a substituted or unsubstituted C1 to 20 alkyl group, a substituted or unsubstituted C1 to 20 alkoxy group, a substituted or unsubstituted C2 to 20 alkenyl group, a substituted or unsubstituted C2 to 20 alkynyl group, a substituted or unsubstituted C6 to 30 aryl group, a substituted or unsubstituted C7 to 30 arylalkyl group, a substituted or unsubstituted C7 to 30 alkylaryl group, a substituted or unsubstituted C1 to 20 heteroalkyl group, or a substituted or unsubstituted C4 to 30 heteroaryl group;

$R_4'$ and $R_5'$ together may form =O; and $R_{10}'$ and $R_{11}'$ together may form =O.

With respect to Formulae 1 and 2, the C1-C20 alkyl group may have a linear or branched structure, and may be a C1-C12, specifically C1-C8, and more specifically a C1-C4 alkyl group. Examples of the C1-C20 alkyl group include methyl, ethyl, propyl, isobutyl, sec-butyl, tert-butyl, pentyl, iso-amyl, and hexyl. The C1-C20 alkyl group may be unsubstituted or at least one hydrogen atom may be substituted with a halogen atom, a hydroxyl group, a nitro group, a cyano group, or the like.

With respect to Formulae 1 and 2, the C1-C20 alkoxy group has an —O-alkyl structure with the oxygen atom linked to the core structure. The C1-C20 alkoxy group may be a C1-C12 alkoxy group, specifically a C1-C8 alkoxy group, and more specifically a C1-C4 alkoxy group. Examples of the C1-C20 alkoxy group include a methoxy group, an ethoxy group, and a propoxy group. The C1-C20 alkoxy group may be unsubstituted or at least one hydrogen atom may be substituted with a halogen atom, a hydroxyl group, a nitro group, a cyano group, or the like.

With respect to Formulae 1 and 2, the C2-C20 alkenyl group may have a linear or branched structure, similar to the C2-C20 alkyl group described above, and includes at least one unsaturated double bond. The C2-C20 alkenyl group may be unsubstituted or at least one hydrogen atom may be substituted with a halogen atom, a hydroxyl group, a nitro group, a cyano group, or the like.

With respect to Formulae 1 and 2, the C2-C20 alkynyl group may have a linear or branched structure, similar to the C2-C20 alkyl group described above, and has at least one unsaturated triple bond. The C2-C20 alkynyl group may be unsubstituted or at least one hydrogen atom may be substituted with a halogen atom, a hydroxyl group, a nitro group, a cyano group, or the like.

With respect to Formulae 1 and 2, the term "C6-C30 aryl group" refers to an aromatic carbocyclic system that has at least one aromatic ring. The C6-C30 aryl group may be a C6-C20 aryl group, or more specifically, a C6 to 10 aryl group. When the C6-C30 aryl group includes more than one aromatic ring, the aromatic rings may be pendantly attached to each other or fused with each other. The C6-C30 aryl group may be unsubstituted or at least one hydrogen atom may be substituted with a halogen atom, a hydroxyl group, a nitro group, a cyano group, or the like. Examples of the C6-C30 aryl group include a phenyl group, a halophenyl group (for example, an o-, m- or p-fluoro phenyl group, or a dichloro phenyl group), a cyanophenyl group, a dicyanophenyl group, a trifluoromethoxyphenyl group, biphenyl group, a halobiphenyl group, a cyanobiphenyl group, a C1-C10 alkylbiphenyl group, a C1-C10 alkoxybiphenyl group, an o-, m-, or p-tolyl group, an o-, m- or p-cumenyl group, a mesityl group, a phenoxyphenyl group, an (α,α-dimethylbenzene)phenyl group, a (N,N'-dimethyl)aminophenyl group, a (N,N'-diphenyl)aminophenyl group, a pentalenyl group, an indenyl group, a naphthyl group, a halonaphthyl group (such as, for example, a fluoronaphthyl group), a C1-C10 alkylnaphthyl group (such as, for example, a methylnaphthyl group), a C1-C10 alkoxynaphthyl group (for example, a methoxynaphthyl group), a cyanonaphthyl group, an anthracenyl group, an azulenyl group, a heptalenyl group, an acenaphthylenyl group, a phenalenyl group, a fluorenyl group, an anthraquinonyl group, a methylanthryl group, a phenanthryl group, a triphenylene group, a pyrenyl group, a chrysenyl group, an ethyl-chrysenyl group, a picenyl group, a perylenyl group, a chloroperylenyl group, a pentaphenyl group, a pentacenyl group, a tetraphenylenyl group, a hexaphenyl group, a hexacenyl group, a rubicenyl group, a coronenyl group, a trinaphthylenyl group, a heptaphenyl group, a heptalenyl group, a pyranthrenyl group, and an ovalenyl group.

With respect to Formulae 1 and 2, the term "C7-C30 alkylaryl group" refers to an aryl group with an alkyl substituent, wherein "aryl" and "alkyl" are defined above. For example, the C7-C30 alkylaryl group may be a benzyl group, but is not limited thereto. The C7-C30 alkylaryl group may be unsubstituted or at least one hydrogen atom may be substituted with a halogen atom, a hydroxyl group, a nitro group, a cyano group, or the like.

With respect to Formulae 1 and 2, the term "C7-C30 arylalkyl group" refers to an alkyl group with an aryl substituent wherein "aryl" and "alkyl" are defined above. For example, the C7-C30 arylalkyl group may be a 4-tert-butylphenyl group or a 4-ethylphenyl group, but is not limited thereto. The C7-C30 arylalkyl group may be unsubstituted or at least one hydrogen atom may be substituted with a halogen atom, a hydroxyl group, a nitro group, a cyano group, or the like.

With respect to Formulae 1 and 2, the term "C1-C20 heteroalkyl group" refers to an alkyl group with an oxygen atom, a nitrogen atom, a sulfur atom, or a phosphorus atom in its main chain. The C1-C20 heteroalkyl group may be unsubstituted or at least one hydrogen atom may be substituted with a halogen atom, a hydroxyl group, a nitro group, a cyano group, or the like.

With respect to Formulae 1 and 2, the term "C4-C30 heteroaryl group" refers to an aromatic ring system including at least one hetero atom selected from an oxygen atom, a nitrogen atom, a sulfur atom, and a phosphorus atom, the other ring atoms being carbon atoms. When the C4-C30 heteroaryl group includes more than one aromatic ring, the aromatic rings may be fused to each other or linked to each other through, for example, a single bond. The C4-C30 heteroaryl group may be unsubstituted or at least one hydrogen atom may be substituted with a halogen atom, a hydroxyl group, a nitro group, a cyano group, or the like.

With respect to Formula 1, the arylcarbonyl group has a structure of aryl-C(=O)— where the aryl group is the same as defined above.

With respect to Formula 1, the alkyloxycarbonyl group has a structure of alkyl-O—(C=O)— where the alkyl group is the same as defined above.

With respect to Formula 1, the alkylcarbonyl group has a structure of alkyl-(C=O)— where the alkyl group is the same as defined above.

With respect to Formula 1, the alkylcarbonyloxy group has a structure of alkyl-(C=O)—O— where the alkyl group is the same as defined above.

Examples of the norbornene-based monomer represented by Formula 1 include norbornene, 2-benzoyl-5-norbornene, ethyl 5-norbornene-2-carboxylate, 2-acetyl-5-norbornene, 5-norbornene-2-yl acetate, cis-5-norbornene-exo-2,3-dicarboxylic acid anhydride, and dimethyl exo-tricyclo(4.2.1.0 (2.5)nona-3,7-diene)-3,4-dicarboxylate, respectively represented by the structures illustrated below. However, the norbornene-based monomer represented by Formula 1 is not limited to these compounds.

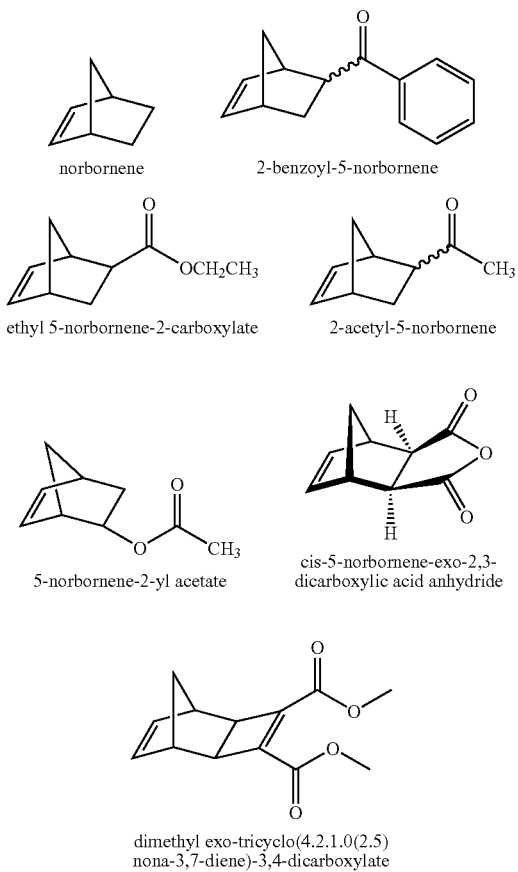

Examples of the dicyclopentadiene-based monomer represented by Formula 2 include dicyclopentadiene, 3a,4,7,7a-tetrahydro-4,7-methano-indene-1,8-dione, and methyl dicyclopentadiene dimmer, respectively represented by the structures illustrated below. However, the dicyclopentadiene-based monomer represented by Formula 2 is not limited to these compounds.

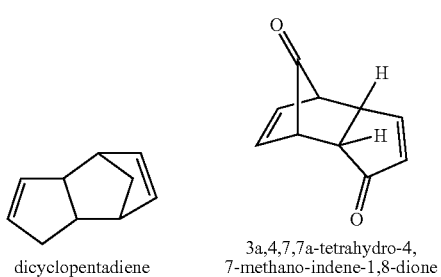

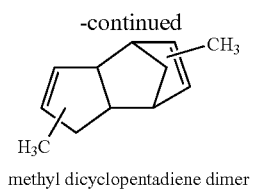

methyl dicyclopentadiene dimer

According to an embodiment, if desired, the electrolyte composition may further include a dispersant, a humidifier, a buffer and the like, in appropriate amounts respectively. Since the components and amounts thereof can be appropriately chosen by those of ordinary skill in the art, the components and amounts thereof will not be described in detail.

A catalyst ink according to an embodiment may include an organic solvent and a catalyst which is dissolved or dispersed in the organic solvent and promotes the ring-opening and polymerization reactions.

The catalyst that promotes the ring-opening and polymerization reactions may be a Grubbs catalyst such as, for example, a Grubbs catalyst disclosed in U.S. Pat. No. 6,111,121. For example, the catalyst that promotes the ring-opening and polymerization reactions may be a first generation or second generation Grubbs catalyst, and may include a compound represented by the following structure:

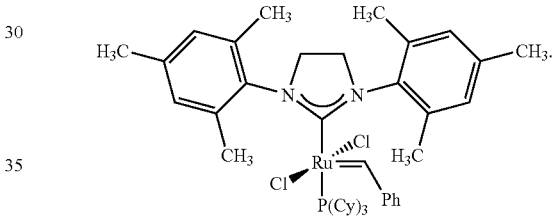

The catalyst ink according to an embodiment may include an organic solvent so that the catalyst is dissolved or dispersed and formed in an ink form that is suitable for printing. The organic solvent that is used in the catalyst ink may be any solvent that dissolves or disperses the catalyst. The solvent may include at least one solvent selected from the group consisting of alcohols such as ethanol (EtOH), methanol (MeOH), propanol (PrOH), butanol (BuOH), isopropylalcohol (IPA), isobutylalcohol, or the like; polar solvents such as dimethylacetamide (DMAC), dimethylformamide (DMF), dimethylsulfoxide (DMSO), tetrahydrofurane (THF), triethylphosphate, trimethylphosphate, or the like; saturated hydrocarbons such as hexane, benzene, or the like; aromatic hydrocarbons such as toluene, xylene, or the like; ketones such as acetone, methylethylketone (MEK), methylisobutylketone (MIBK), diisobutylketone, or the like; esters such as ethyl acetate, butyl acetate, or the like; and ethers such as dioxane, diethylether, or the like. The amount of the catalyst may be in a range of about 0.1 to about 20 wt % based on the weight of the catalyst ink.

The catalyst ink may be inkjet-printed. In this regard, the viscosity of the catalyst ink may be about 100 mPa·sec or lower at a temperature of 25° C. and a shear rate of 1000 sec$^{-1}$. For example, the viscosity of the catalyst ink may be in the range of about 2 to about 6 mPa·sec at a temperature of 25° C. and a shear rate of 1000 sec$^{-1}$.

Hereinafter, a method of manufacturing a solid electrolyte membrane using the electrolyte composition and the catalyst ink will be described in detail with reference to FIGS. 2 and 3.

Figure 2:
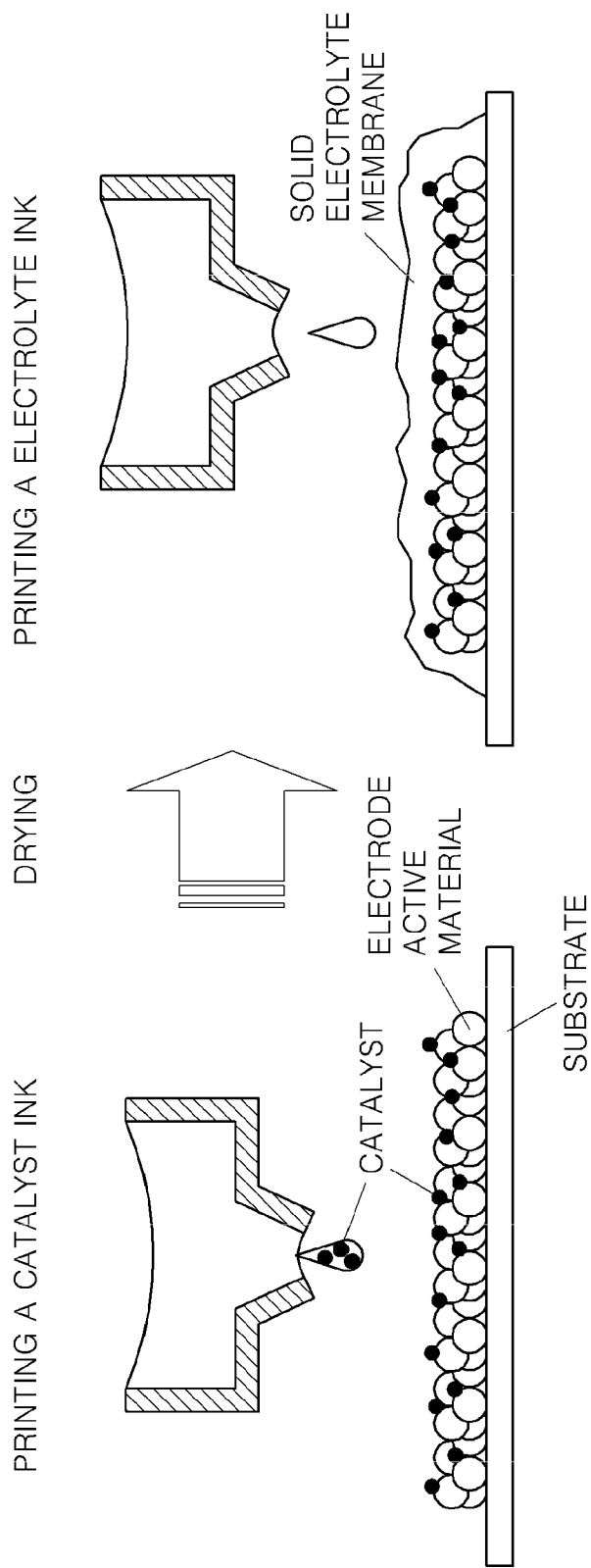
FIG. 2 is a diagram that depicts a method of manufacturing a solid electrolyte membrane, according to an embodiment.

According to an embodiment of the present invention, the method of manufacturing the solid electrolyte membrane includes, as schematically illustrated in FIG. 2; printing the catalyst ink onto an electrode; drying the printed catalyst ink; applying the electrolyte composition including the cycloolefin-based monomer onto an area of the electrode on which the catalyst ink is printed; such that a ring-opened polymer of the cycloolefin monomer is formed in the electrolyte composition.

According to this embodiment, the catalyst ink is printed onto an area in which an electrolyte membrane is to be formed. Specifically, the catalyst ink may be directly ejected onto an electrode on which an active material is coated. When the catalyst ink is ejected onto the electrode, a catalyst included in the catalyst ink permeates between active material particles.

The printed catalyst ink may be dried at a temperature in the range of about 20 to about 200° C. in a vacuum condition for 1 minute to 8 hours to remove the solvent. However, the drying conditions are not limited thereto.

The electrolyte composition is applied onto the area where the catalyst ink was printed. The electrolyte composition may be an electrolyte ink that is inkjet-printable. The electrolyte composition may be applied by inkjet printing or any other printing method, or by spray coating. When the electrolyte ink is printed, the ring-opening and polymerization reactions of the cycloolefin-based monomer included in the electrolyte ink begin to occur due to the activity of the catalyst contained in the catalyst ink disposed on the electrode, and a ring-opened polymer layer is formed, thereby forming a solid electrolyte membrane on the electrode.

Figure 3:
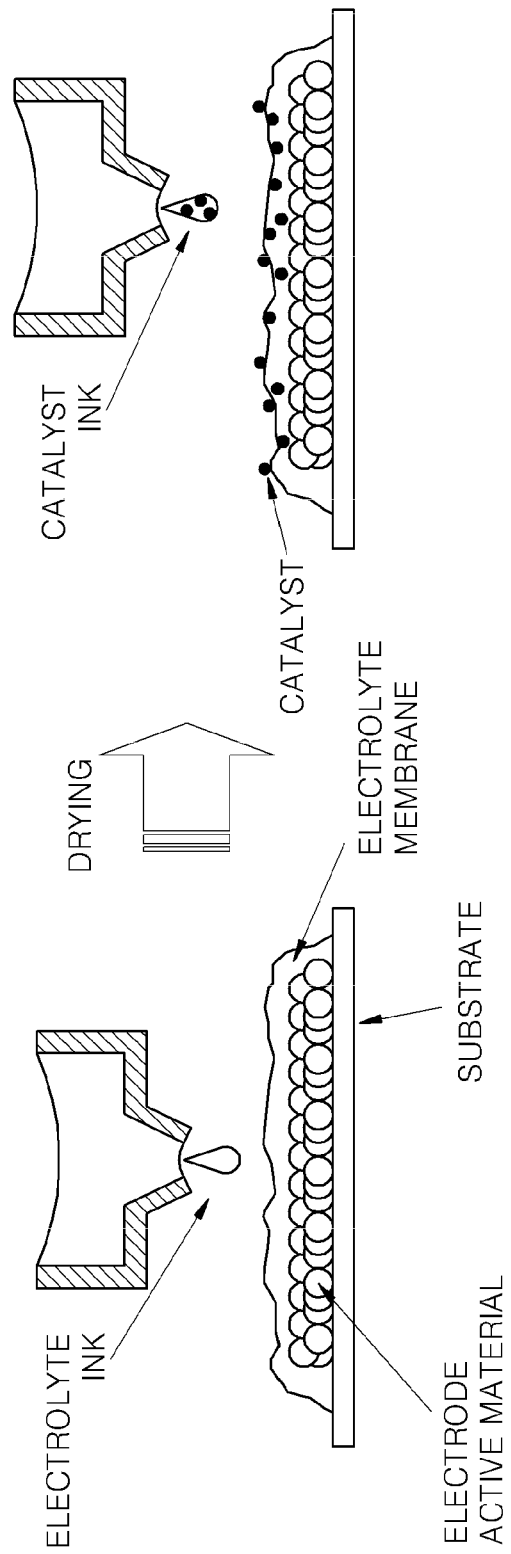
FIG. 3 is a diagram that depicts a method of manufacturing a solid electrolyte membrane, according to another embodiment.

According to another embodiment of the present invention, the method of manufacturing the solid electrolyte membrane includes, as schematically illustrated in FIG. 3, applying the electrolyte composition on an electrode; drying the printed electrolyte composition; printing the catalyst ink onto an area of the electrode on which the electrolyte composition was applied; such that a ring-opened polymer of the cycloolefin monomer is formed in the electrolyte composition. This method differs from the method described previously in that the sequence of printing the catalyst ink and applying the electrolyte composition is reversed.

In methods of manufacturing the solid electrolyte membrane described above, the forming of a ring-opened polymer may be performed at room temperature.

According to an embodiment, the solid electrolyte membrane can be formed by ink-jet printing the catalyst ink and electrolyte ink as described above, instead of coating a conventional slurry. For the ink-jet printing, the catalyst ink or the electrolyte ink is printed in a form of droplets through a nozzle onto a collector. The ink-jet printing may be performed using a thermal driving method or a piezoelectric driving method. Specifically, in consideration of thermal stability of battery forming materials, the ink-jet printing may be performed by using a piezoelectric driving method. The ink-jet printing method is not limited. For example, the ink-jet printing may be performed using an inkjet printer including an inkjet head connected to a commercially available computer and using appropriate software, in order to form a predetermined pattern.

In general, to manufacture a solid electrolyte membrane according to a general process, a heating or UV hardening process using an initiator may be required. In addition, a general process may require a patterning process involving complex processes such as a photoresist process, an exposure process, and a developing process. However, according to the method of manufacturing a solid electrolyte membrane according to the present embodiments, when the electrolyte ink described above is ink-jet printed, a solid electrolyte membrane having a predetermined pattern is formed and a separate hardening process is not required.

According to the method of preparing a solid electrolyte membrane, the solid electrolyte membrane is formed by ink-jet-printing. The method may be carried but in conjunction with forming other features of a battery by ink-printing.

According to another embodiment, the solid electrolyte membrane may include a ring-opened polymer of the cycloolefin-based monomer that is impregnated with a lithium salt-containing solvent. The ring-opened polymer of the cycloolefin-based monomer may be a ring-opened polymer of a norbornene-based monomer, represented by Formula 3 below, or a ring-opened polymer of a dicyclopentadiene-based monomer, represented by Formula 4 below:

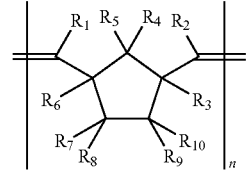

[Formula 3]

wherein $R_1$ to $R_{10}$ are the same as defined in Formula 1, and n is an integer of 1 or more. For an upper limit of n, an unlimited number of the norbornene-based monomers may be ring-opened polymerized according to the amount of the catalyst. Accordingly, n may be appropriately chosen by one of an ordinary skill in the art, for example, according to the amount of the catalyst and according to a desired polymer length.

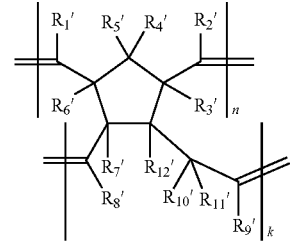

[Formula 4]

wherein $R_1'$ to $R_{12}'$ are the same as defined in Formula 2, and each of n and k is an integer of 1 or more. For upper limits of n and k, according to the amount of the catalyst, an unlimited number of dicyclopentadiene-based monomers may be ring-opened and polymerized. n and k may be appropriately chosen by one of ordinary skill in the art, for example, according to the amount of the catalyst and according to a desired polymer length.

In addition, since the catalyst included in the catalyst ink permeates between electrode active material particles when the solid electrolyte membrane is manufactured, the ring-opening and polymerization reactions of the cycloolefin-based monomer due to the catalyst may also occur in between the electrode active material particles. Accordingly, a contact surface between the solid electrolyte membrane manufactured through ring-opening and polymerization reactions and an electrode, and electrochemical properties of the electrode, that is, contact properties with respect to the electrode may be improved.

Hereinafter, a secondary battery including the solid electrolyte membrane described above will be described in detail, according to an embodiment.

FIG. 1 is a schematic sectional view of a secondary battery 10 according to an embodiment. Referring to FIG. 1, the secondary battery 10 according to the present embodiment includes a cathode 13, an anode 15, and a solid electrolyte membrane 14 interposed between the cathode 13 and the anode 15. The cathode 13 is formed on a cathode collector 12 that is formed in a pattern and the cathode collector 12 is disposed on a substrate 11. Meanwhile, an anode collector 16 is disposed on the substrate 11. A protective layer 17 is coated on the anode 16. As a specific, non-limiting example, the cathode collector 12 and anode collector 16 may each be disposed on the substrate 11. The cathode 13 may be disposed on the cathode collector 12 and the solid electrolyte membrane 14 may be disposed to cover the cathode 13 and to contact the cathode collector 12, a portion of the substrate between the cathode collector 12 and the anode collector 16, and a portion of the anode collector 16. The anode 15 may be disposed to contact the solid electrolyte membrane 14 on a side opposite to the side of the electrolyte membrane 14 that contacts the cathode 13 and to contact the anode collector 16. It is to be understood that other configurations for the secondary battery are possible.

A method of manufacturing the secondary battery 10 will now be described in detail.

A metallic ink for each of the cathode collector 12 and the anode collector 16 is prepared. Each metallic ink is injected into an inkjet print cartridge and then printed onto the substrate 11 to a desired pattern thickness, and then heat-treated at a temperature in the range of about 100 to about 600° C., thereby forming the cathode collector 12 and the anode collector 16. Then, a cathode oxide ink is printed in a desired pattern on the cathode collector 12 to a desired pattern thickness, and then heat-treated at a temperature in the range of about 100 to about 150° C., thereby forming the cathode 13. Then, the catalyst ink described above is printed in an area in which an electrolyte is to be coated and then, the catalyst ink is dried to remove the solvent. When the catalyst ink is dried, the electrolyte ink described above is printed onto an area where the catalyst is present such that a polymerization reaction occurs for a predetermined time period, thereby forming the solid electrolyte membrane 14. As noted above, the printing sequence of the electrolyte and the catalyst ink may be changed such that the electrolyte ink may printed onto an area first, followed by the catalyst ink. Then, an anode oxide ink is printed and the anode oxide ink is dried to remove a solvent, thereby forming the anode 15. Then, a protective layer 17 is coated on the resultant structure to completing the manufacture of the secondary battery 10. As described above, all of the components for a lithium battery can be easily formed by ink-jet printing.

For the metallic ink used to form the cathode collector 12 and anode collector 16, metallic particles included therein may be any metallic particles that are used to form a collector of a secondary battery. For example, the cathode collector 12 may be formed of Al, Ni, Fe SUS, or Ag, and the anode collector 16 may be formed of Cu, Fe SUS, or Ni.

Each of the cathode oxide ink and the anode oxide ink may be prepared in the following manner. First, oxide particles, a conducting agent, a solvent, and a binder are mixed in appropriate amounts. Then, ball milling and bead milling are sequentially performed and the milled product is sequentially passed through 1 μm and 0.45 μm polytetrafluoroethylene (PTFE) syringe filters.

Each of the cathode oxide ink and the anode oxide ink may include any conventional oxide particles that are used as an electrode active material. Examples of an available cathode active material include Li—Co based composite oxides such as $LiCoO_2$, Li—Ni based composite oxides such as $LiNiO_2$, Li—Mn based composite oxides such as $LiMn_2O_4$ or $LiMnO_2$, Li—Cr based composite oxides such as $Li_2Cr2O_7$ or $Li_2CrO_4$, Li—Fe based composite oxides such as $LiFeO_2$, and Li—V based composite oxides. Examples of an available anode active material include Li—Ti based composite oxides such as $Li_4Ti_5O_{12}$, transition metal oxides such as $SnO_2$, $In_2O_3$ or $Sb_2O_3$, and carbon such as graphite, hard carbon, acetylene black, or carbon black. In each of the cathode oxide ink and the anode oxide ink, the amount of oxide particles may be in a range of about 0.1 to about 10 wt %, specifically about 3 to about 7 wt %, based on the weight of the entire corresponding oxide ink. Within that range, excellent printing efficiency can be obtained, agglomeration of particles may be prevented, and excellent ink stability and ejection characteristics can be obtained.

The conducting agent is used to improve the conductivity of the oxide particles. Examples of the conducting agent include acetylene black, carbon black, graphite, carbon fiber, and carbon nanotube. The amount of the conducting agent may be in a range of about 1 to about 20 wt % based on the weight of the oxide particles.

Each of the cathode oxide ink and the anode oxide ink may further include a dispersant to disperse the oxide particles and the conducting agent. Non-limiting examples of an available dispersant include conventional dispersants selected from the group consisting of a fatty acid salt, an alkyldicarboxylic acid salt, an alkyl sulfuric acid ester salt, a polyvalent sulfuric ester alcohol salt, alkylnaphthalenesulfate, alkylbenzenesulfate, an alkylnaphthalene sulfuric acid ester salt, an alkylsulfone succinic acid salt, a naphthenic acid salt, an alkylethercarboxylic acid salt, an acylated peptide, an alphaolefin sulfate, an N-acylmethyltaurine salt, an alkylethersulfate, a secondary polyhydric alcohol ethoxy sulfate, a polyoxyethylene-alkyl-phenylethersulfate, an alkylether phosphoric acid ester salt, an alkyl phosphoric acid ester salt, an alkylamine salt, an alkylpyridium salt, alkylimidazolium salt, a fluorine- or silicon-based acrylic acid polymer, polyoxyethylenealkylether, polyoxyethylene stearyl ether, lanolin derivatives of polyoxyethylene, a polyoxyethylene/polyoxypropylene copolymer, a polyoxyethylene sorbitan fatty acid ester, a monoglyceride fatty acid ester, a sucrose fatty acid ester, a alkanolamide fatty acid, a polyoxyethylene fatty acid amide, a polyoxyethylene-alkylamine, a polyvinylalcohol, a polyvinylpyridone, a polyacrylamide, a carboxylic group-containing aqueous polyester, a hydroxyl group-containing cellulose based resin, an acryl resin, a butadiene resin, acrylic acids, styrene acryls, polyesters, polyamides, polyurethanes, alkylbetamine, alkylamineoxide, and phosphatidylcholine. Each of the cathode oxide ink and the anode oxide ink may include one or more of the above dispersants. The amount of the dispersant may be in a range of about 1 to about 20% based on the weight of the oxide particles. However, the dispersant may be omitted according to characteristics of the corresponding electrode or dispensability.

Each of the cathode oxide ink and the anode oxide ink includes a binder to provide a binding force between ink particles and a polar plate, cathode collector or anode collector after ink-jet printing. An available binder may include one or more compounds selected from the group consisting of polyvinyl alcohol, ethylene-propylene-diene terpolymer, styrene-butadiene rubber, polyvinylidene fluoride (PVdF), polytetra fluoroethylene (PTFE), a tetrafluoroethylene-hexafluoropropylene copolymer, and a carboxymethylcellulose. For example, the binder may be PVdF.

For each of the cathode oxide ink and the anode oxide ink, an available solvent includes, in addition to conventional N-methyl-2-pyrrolidone (NMP) as a main solvent, at least one solvent selected from the group consisting of alcohols such as ethanol (EtOH), methanol (MeOH), propanol (PrOH), butanol (BuOH), isopropylalcohol (IPA) and isobutylalcohol; and dimethylacetamide (DMAC), dimethylformamide (DMF), dimethylsulfoxide (DMSO), tetrahydrofurane (THF), triethylphosphate, and trimethylphosphate. Alcohols may be used to control the drying rate, and dimethylacetamide (DMAC), dimethylformamide (DMF), dimethylsulfoxide (DMSO), tetrahydrofurane (THF), triethylphosphate, or trimethylphosphate may be used to increase pattern accuracy and resolution. These solvents may be used in various mixture ratios according to applications and purposes. In addition, at least one solvent selected from the group consisting of saturated hydrocarbons such as hexane; aromatic hydrocarbons such as toluene or xylene; ketons such as acetone, methylethylketone (MEK), methylisobutylketone (MIBK), or diisobutylketone; esters such as ethyl acetic acid or butyl acetic acid; and ethers such as dioxane or diethylether may further be added to the solvent.

The secondary battery according to an embodiment uses the solid electrolyte membrane formed by ink-jet printing the electrolyte ink and catalyst ink described above. Therefore, the secondary battery can be manufactured in a thin, lightweight, and flexible structure and thus is suitable for a power source of an integrated circuit device Hereinafter, examples and comparative examples will be described in detail. However, these examples are for illustrative purposes only and are not intended to limit the scope of the invention.

EXAMPLE 1

4.65 wt % of $LiCoO_2$, 0.15 wt % of acetylene black (AB), and 0.2 wt % of polyvinylidene fluoride (PVdF) were added to a mixed solvent that includes 70 wt % of N-methyl-2-pyrrolidone (NMP), 20 wt % of ethanol (EtOH), and 5 wt % of diethyleneglycol (DEG), and then the resultant mixture was dispersed by using a paint shaker including zirconia beads having a particle size of 0.3 mm for 2 hours. Then, the dispersed product was sequentially passed through 1 μm and 0.45 μm polytetrafluoroethylene (PTFE) syringe filters, thereby providing an electrode ink. The electrode ink was printed onto an aluminum foil in an inkjet printer Fuji Dimatix DMP-2800, thereby forming a cathode.

5 wt % of a Grubbs catalyst (the manufacturer: Sigma-Aldrich Co., Ltd., the product name: Grubbs catalyst) was added to and dissolved in ethanol EtOH to a viscosity of 3.528 mPa·sec at a shear rate of 1000 $sec^{-1}$, and then the resultant catalyst ink was printed on the electrode in the same pattern as the electrode and then dried for 10 minutes at a temperature of 60° C. to remove the solvent.

1.3M of $LiPF_6$ was added to a mixed solvent that included ethylene carbonate and diethyl carbonate in a volume ratio of 3:7, thereby producing an electrolytic solution. Then, 5 wt % of dicyclopentadiene was added to the electrolytic solution to prepare an electrolyte ink (viscosity: 4.475 mPa·sec at a shear rate of 1000 $sec^{-1}$). The electrolyte ink was ejected onto the printed Grubbs catalyst ink by using the inkjet printer, thereby forming a solid electrolyte membrane.

Figure 4:
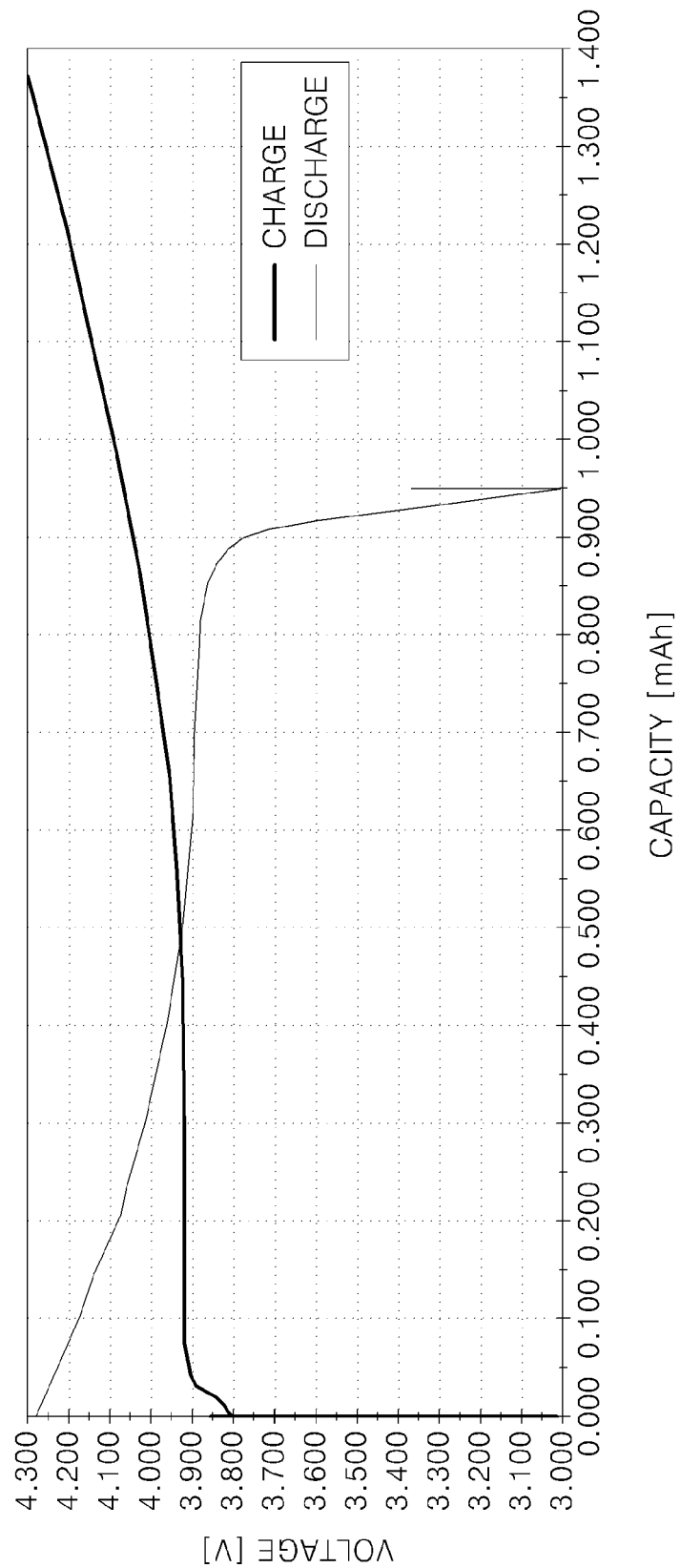
FIG. 4 is a graph of charge/discharge characteristics of a secondary battery manufactured according to Example 1.

The cathode, the solid electrolyte membrane, and an anode formed of lithium metal were used to manufacture a 2016 coin cell (CR2016 type). The obtained coin cell was charged with a constant current at a rate of 0.1 C until the voltage with respect to the anode reached 4.3 V, and then, while the voltage of 4.3 V was maintained constant, the coin cell was charged at a constant voltage until the current with respect to the cell capacity reached a rate of 0.05 C rate. Then, the constant current discharging was performed at a current of 0.1 C rate with respect to the cell capacity until the voltage reached 3.0 V. The charging and discharging results are shown in FIG. 4.

EXAMPLE 2

4.65 wt % of $LiCoO_2$, 0.15 wt % of acetylene black (AB), and 0.2 wt % of polyvinylidene fluoride (PVdF) were added to a mixed solvent that included 70 wt % of N-methyl-2-pyrrolidone (NMP), 20 wt % of ethanol (EtOH), and 5 wt % of diethyleneglycol (DEG), and then the resultant mixture was dispersed by using a paint shaker using zirconia beads having a particle size of 0.3 mm for 2 hours. Then, the dispersed product was sequentially passed through 1 μm and 0.45 μm polytetrafluoroethylene (PTFE) syringe filters, thereby completely forming an electrode ink. The electrode ink was printed onto an aluminum foil in an inkjet printer Fuji Dimatix DMP-2800, thereby forming a cathode.

5 wt % of a Grubbs catalyst is added to and dissolved in ethanol EtOH to a viscosity of 3.528 mPa·sec at a shear rate of 1000 $sec^{-1}$, and then the resultant catalyst ink was printed on the electrode in the same pattern as the electrode and then dried for 10 minutes at a temperature of 60° C. to remove the solvent.

1.3M of $LiPF_6$ was added to a mixed solvent that included ethylene carbonate and diethyl carbonate in a volume ratio of 3:7, thereby producing an electrolytic solution. Then, 5 wt % of norbornene was added to the electrolytic solution to prepare an electrolyte ink (viscosity: 3.928 mPa·sec at a shear rate of 1000 $sec^{-1}$). The electrolyte ink was ejected onto the printed Grubbs catalyst ink by using the inkjet printer to form a solid electrolyte membrane.

The cathode, the solid electrolyte membrane, and an anode formed of lithium metal were used to manufacture a 2016 coin cell (CR2016 type). The obtained coin cell was charged with a constant current at a rate of 0.1 C until the voltage with respect to the anode reached 4.3 V, and then, while the voltage of 4.3 V was maintained constant, the coin cell was charged at a constant voltage until the current with respect to the cell capacity reached 0.05 C rate. Then, the constant current discharging was performed at a current of 0.1 C rate with respect to the cell capacity until the voltage reached 3.0 V. The charging and discharging test results are shown in FIG. 5.

COMPARATIVE EXAMPLE 1

A coin cell was manufactured in the same manner as in Example 1, except that the Grubbs catalyst ink was not used and dicyclopentadiene was not added to the electrolyte ink. The obtained charging and discharging test results of the coin cell are shown in FIG. 6.

Figure 5:
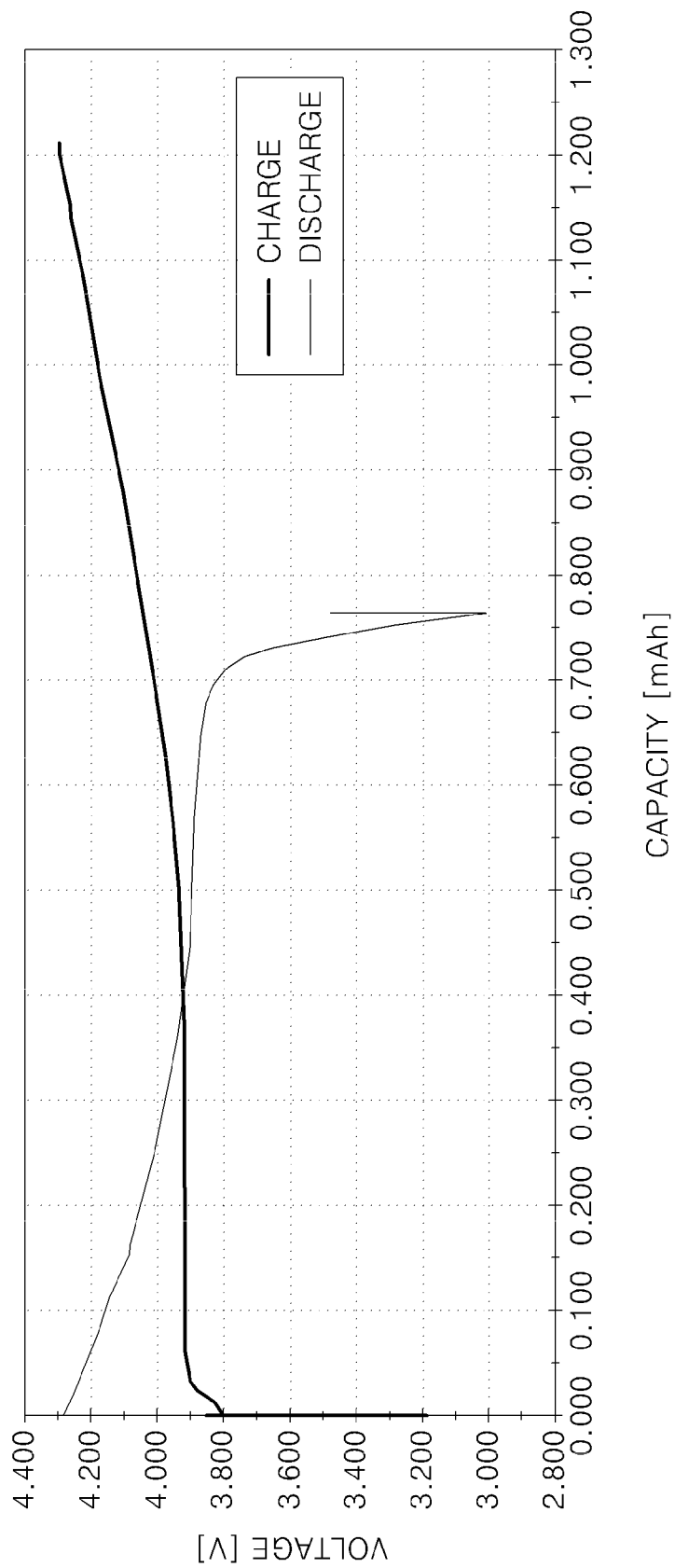
FIG. 5 is a graph of charge/discharge characteristics of a secondary battery manufactured according to Example 2.
Figure 6:
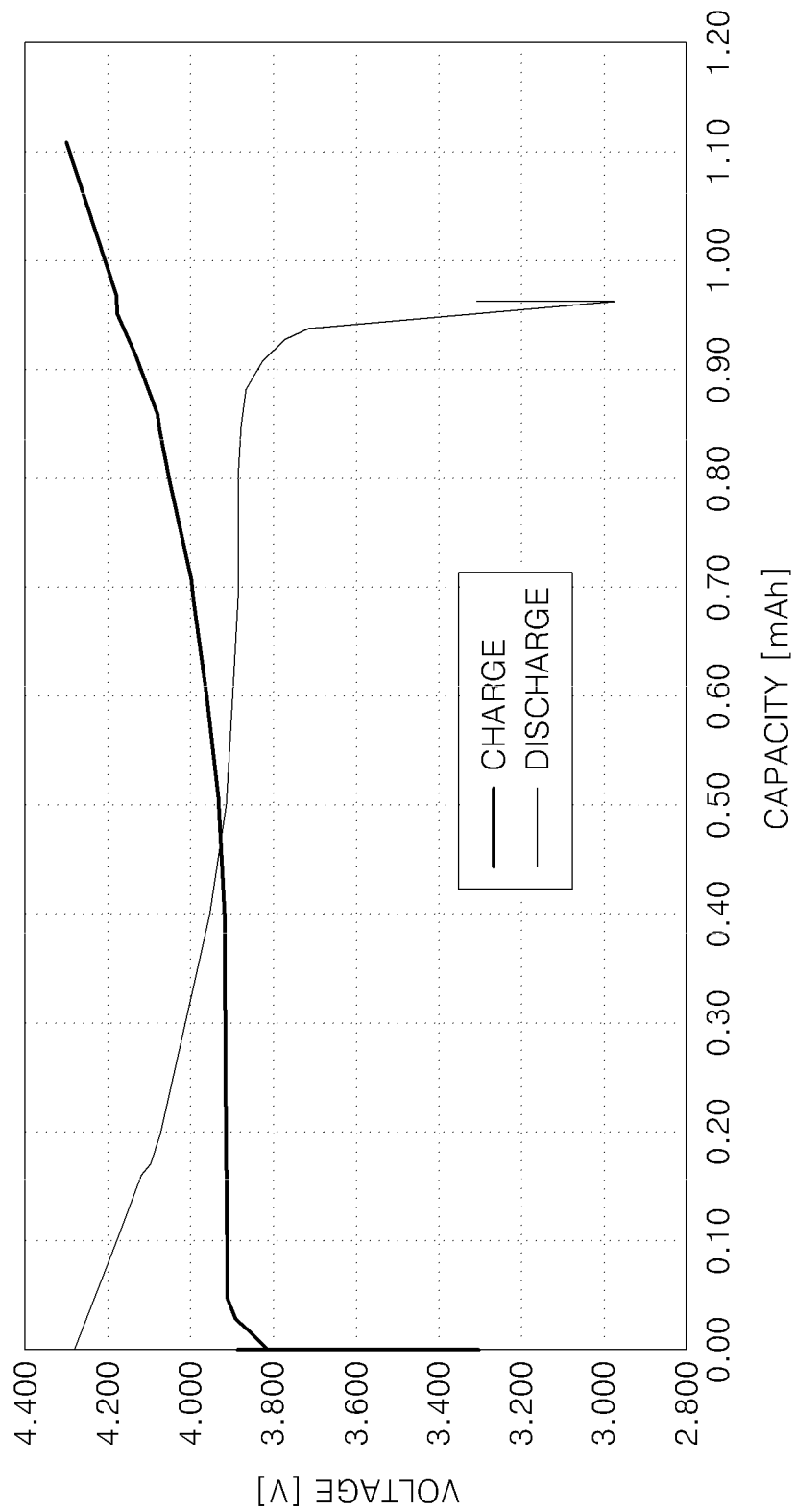
FIG. 6 is a graph of charge/discharge characteristics of a secondary battery manufactured according to Comparative Example 1.

Referring to FIGS. 4, 5 and 6, it can be seen that the secondary batteries manufactured according to Examples 1 and 2 and Comparative Example 1 have similar charge/discharge capacities to each other. As described above, when an electrolyte ink and catalyst ink according to an embodiment are used, a solid electrolyte membrane can be formed by ink-jet printing while conventional battery characteristics are retained.

As described above, according to the one or more above embodiments, a solid electrolyte membrane having a predetermined pattern and excellent contact characteristics with an electrode can be formed.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An electrolyte composition comprising:
   a solvent;
   a lithium salt dissolved in the solvent; and
   a cycloolefin-based monomer dissolved or dispersed in the solvent, wherein:
   the electrolyte composition is an electrolyte ink which is inkjet-printable, the viscosity of the electrolyte ink is about 100 mPa·sec or lower at a temperature of 25° C. and a shear rate of 1000 sec$^{-1}$, and
   the cycloolefin-based monomer is selected from at least one dicyclopentadiene-based monomer selected from the group consisting of dicyclopentadiene and 3a, 4, 7, 7a-tetrahydro-4,7-methano-indene-1,8-dione.

2. The electrolyte composition of claim 1, wherein the viscosity of the electrolyte ink is in the range of about 2 to about 6 mPa·sec at the temperature of 25° C. and the shear rate of 1000 sec$^{-1}$.

3. The electrolyte composition of claim 1, wherein the amount of the cycloolefin-based monomer is in the range of about 0.5 to about 10 wt %.

* * * * *